(12) United States Patent
Druet et al.

(10) Patent No.: US 9,294,585 B2
(45) Date of Patent: Mar. 22, 2016

(54) NEAR LIVE-MIGRATION OF OPERATING SYSTEM AND APPLICATION

(71) Applicant: International Business Machines Corporation, Armonk, NY (US)

(72) Inventors: Nicolas A. Druet, Montreal (CA); Jacques Fontignie, Onex (CH); Claudio Marinelli, Rome (IT); Luigi Pichetti, Rome (IT); Pierre-Antoine Queloz, Versoix (CH)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 13/956,935

(22) Filed: Aug. 1, 2013

(65) Prior Publication Data

US 2014/0089393 A1     Mar. 27, 2014

(30) Foreign Application Priority Data

Sep. 25, 2012   (GB) .................................. 1217027.0

(51) Int. Cl.
*H04L 29/08*       (2006.01)
(52) U.S. Cl.
CPC ...................................... *H04L 67/34* (2013.01)
(58) Field of Classification Search
CPC ....... H04L 67/34; G06F 12/08; G06F 9/4856; G06F 3/065; G06F 3/067; G06F 3/0631
See application file for complete search history.

(56) References Cited

U.S. PATENT DOCUMENTS

| | | | |
|---|---|---|---|
| 8,019,962 B2 | 9/2011 | Armstrong et al. | |
| 8,069,218 B1 * | 11/2011 | Tormasov et al. | ............ 709/216 |
| 2011/0032830 A1 | 2/2011 | Merwe et al. | |
| 2011/0066597 A1 | 3/2011 | Mashtizadeh et al. | |
| 2011/0179415 A1 | 7/2011 | Donnellan et al. | |
| 2012/0096149 A1 | 4/2012 | Sunkara et al. | |

OTHER PUBLICATIONS

Search Report under Section 17(5) dated Jan. 28, 2013, GB Application No. GB1217027.0, 3 pages.
Liu, Haikun et al., "Live Migration of Virtual Machine Based on Full System Trace and Replay", HPDC'09, Munich, Germany, Jun. 11-13, 2009, pp. 101-110.

* cited by examiner

*Primary Examiner* — Kim T Nguyen
(74) *Attorney, Agent, or Firm* — Francis Lammes; Stephen J. Walder, Jr.; Joseph Petrokaitis

(57) ABSTRACT

A method for live-migration of an operating system and an application is provided. The operating system runs on a first computer. The application may run on the operating system. The live-migration may be performed to a second computer while the application showing no externally detectable downtime during live-migration of the application. The method may comprise operating a tracking tool that may track and store data modifications to a disk-system of the computer in a tracking file, triggering a shutdown of the first computer while the tracking tool continues to operate in tracking mode and shut down the first computer completely. Then restarting the first computer and sending the data modifications stored prior to the complete shutdown of the first computer to the second computer, which then may be started based on the sent data, followed by starting the application such that from an external perspective no application disruption is detectable.

18 Claims, 5 Drawing Sheets

NEAR LIVE-MIGRATION OF OPERATING SYSTEM AND APPLICATION

BACKGROUND

The invention relates generally to a live-migration of an operating system and an application from a source computing system to a target computing system. The invention relates further to a source computing system for live-migration and a target computing system for live-migration, a data processing program, and a computer program product.

Live-migration is a known feature in backup and load balancing tools that allow moving data and an operating system from a source to a target machine or computer with practically no downtime of the application which is running. This feature is particularly important for production servers, especially in cloud environments, where productive applications have to be active and accessible as much as possible, and where a simple unavailability of the application could cause trouble and financial losses for a company.

The general technology of live-migration is known and works fine in virtualized environments using known products like VMware or Hyper-V, but they do not work in physical environments. The reason of this limitation is that it is impossible to migrate a memory status of physical systems between a first or source system, and a second or target system. The reason is due to the fact that techniques exist for disk migration, but not for a migration of a memory that is in full use. That means that an application can have its persistent data, i.e., the data on a disk migrated to a target system, but not the memory status of underlying systems running the applications. In other terms, when a migration is performed, the disk may be in a consistent state, but not the memory used by the application or supporting other programs like the operating system. Typically, the following sequence may be performed, incurring the following problems: Firstly, an application may have to be restarted on the target machine. However, transactions in progress on the source machine are lost. Because the memory status of the application on the source system is lost, the application will have to get all configuration status information from the disk to restart. However, these do not mirror a complete status of the source system because the memory status is not available as part of the data on the disk. If there were temporary data in RAM (random access memory) on the source machine before a shutdown, the application on the target system may have errors during startup and causing inconsistencies in, e.g., open transactions.

In respect to virtualized environments, e.g., the following techniques have been disclosed:

Document US2011/0066597A1 discloses a migration of persistent data of virtual machines between and across data stores. The method includes the steps of copying the persistent data at the source data store to the destination data store, updating a bitmap data structure during the copying step to indicate which blocks of the persistent data have been modified during the copying step, identifying the blocks that have been modified during the copying step using the bitmap data structure, and copying the identified blocks to the destination data store.

Document US2011/0179415A1 discloses that a virtual machine is migrated between a source cloud and a destination cloud. A temporary storage is mounted to a partition management firmware of the source cloud and to a partition management firmware of the destination cloud. A first storage location migration migrates the virtual machine from the source cloud to the at least one temporary storage. A second storage location migration migrates the virtual machine from the at least one temporary storage to a final destination storage of the destination cloud. The temporary storage is then un-mounted from the partition management firmware of the source cloud and from the partition management firmware of the destination cloud.

However, this virtual machine migration would not work if the application would not run in a virtual environment but in a physical environment, i.e., on an operating system that is running directly on a physical computer without using a hypervisor building a simulation or emulation of a hardware system.

Thus, there may be a need for a live-migration for applications running in physical environments.

SUMMARY

This need may be addressed by a method for live-migration or near live-migration of an operating system and an application, a source and a target computing system for live-migration, a data processing program, and a computer program product according to the independent claims.

According to one embodiment a method for a live-migration of an operating system and an application may be provided. The operating system may run on a first computing system—in particular a source computing system—and the application may run on the operating system. The live-migration may be performed to a second computing system, in particular a target computing system, so that the application may show no externally detectable downtime during live-migration of the application. The method may comprise performing a disk copying—e.g., a one off disk copy or disk clone process—from a disk system of the first computing system to a disk system of the second computing system, which may, e.g., be operated in a maintenance mode. The method may also comprise operating a tracking tool running on the first computing system in a tracking mode, wherein the tracking tool may track and store data modification information to the disk system of the first computing system after the disk copying in a tracking file, as well as triggering a shutdown of the first computing system, while the tracking tool may continue to operate in tracking mode during the shutdown as long as possible, and shut down the first computing system completely. Furthermore, the method may comprise restarting, e.g., rebooting, the first computing system, and sending the tracking file comprising the data modification information stored prior to the complete shutdown of the first computing system to the second computing system, as well as modifying the content of the disk system of the second computing system using the sent data modification information, such that the disk system of the second computing system may represent a status of the disk system of the first computing system directly before the complete shutdown, and also starting the operating system on the second computing system in a full functioning mode. Finally, the method may comprise starting the application on the second computing system and resuming operation of the application such that from a user perspective no disruption of a continuous operation of the application may be detectable.

It may be noted that the term live-migration may be interpreted in the sense of a continuous operation of the application seen from another program accessing the application. There may be a delay that may be related to the migration to a new computing system; however the status, e.g., a transaction status may be migrated completely without a need for any transaction restart. In this sense, some of the live-migration may also be named a near live-migration by persons skilled in the art.

It may also be noted that a differentiation between the 'shutdown' and 'process of a shutdown' and a 'complete shutdown' may be made as described below.

Furthermore, it may be understood that the disk copying may be performed after the tracking tool may have been started.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
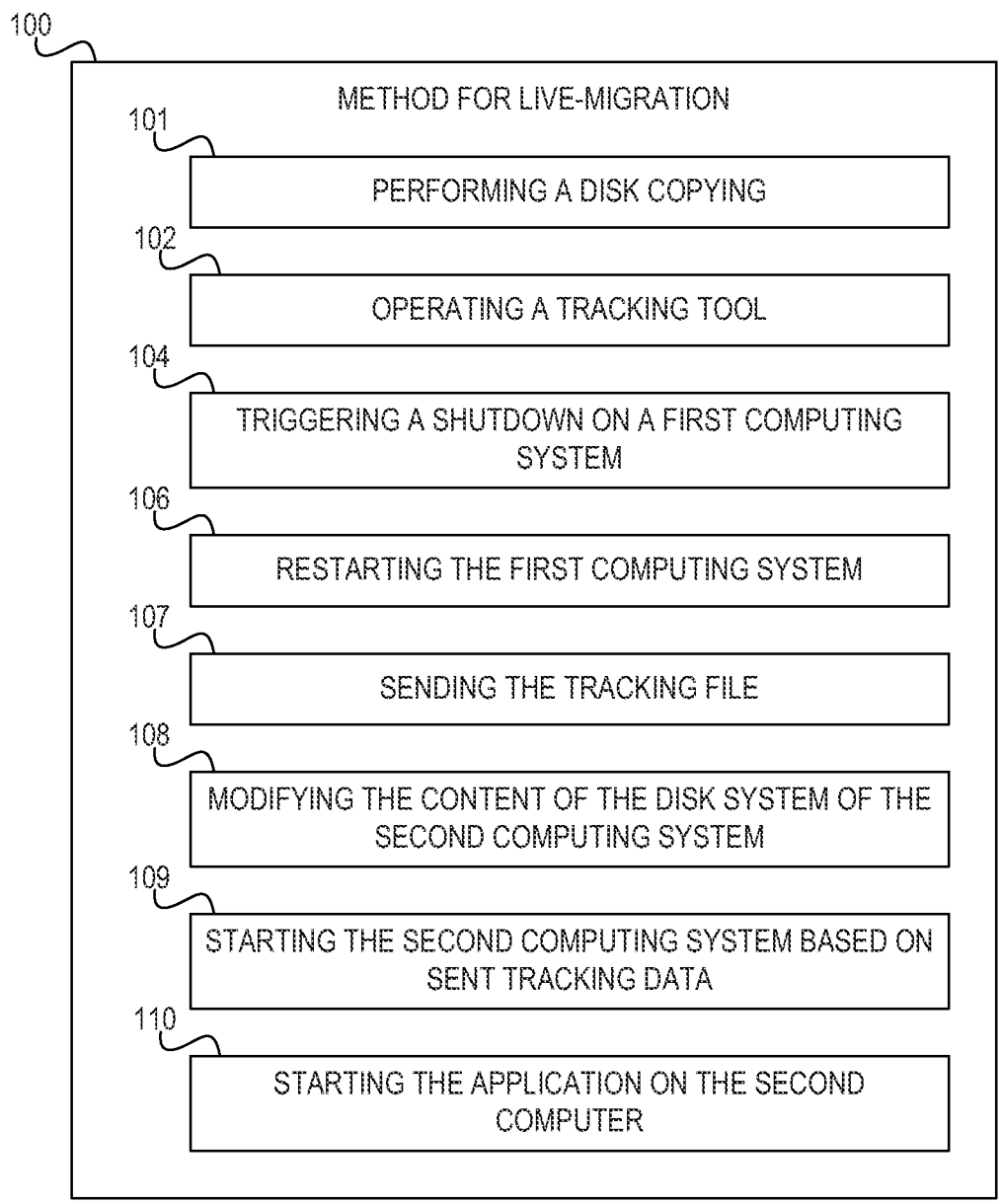
FIG. 1 shows a block diagram of an embodiment of the inventive method for live-migration.

Regarding the operating system and the application that may be migrated, it may be mentioned that identical software programs are meant. They may be identical in the sense that one is an exact copy of the other.

As mentioned above, the first and second computing system operate with mirrored disks as they are known from prior art. This means that a one-off copy process may be performed from the first computing system to the second computing system, which may be operated in a recovery mode in order to copy changes made to a disk system of the first computing system to a disk system of the second computing system. Once this disk copying may have been performed, changes to the content of the disk system of the first computing system may be tracked in a tracking file, such that additional changed made to the content of the disk system of the first computing system may be reconstructed from the moment of the end of the disk mirroring.

In the context of this application, the following conventions, terms and/or expressions may be used:

The term computing system may denote a physical computer or a virtual machine. A virtual machine (VM) may be a software implementation of a hardware machine (i.e., a computer) that may execute programs like a physical machine.

The term live-migration may be understood in the sense of a near live-migration as already highlighted above. From the perspective of another program staying in communicative collaboration with the application, no application disruption of the operation may be detectable, i.e., also not for open transactions. They may be executed as if no live-migration may have happened. Data and process status consistency may always be guaranteed. However, a time delay in operation may happen due to the shutdown of the first computer, the sending of the tracking file and the reboot of the second computing system. After all, the experienced time delay may be kept to a minimum.

The term operating system may denote a set of software components that may manage computing systems, i.e., hardware resources and that may provide common services for application programs. The operating system may be a vital component of system software in a computing system. Application programs, or in short applications, may require an operating system to function.

The term first computing system may denote a computing system from which the live-migration, or in short migration, may start or be initiated. It may denote the origin for the migration process. It may also be named a source system or source computing system in contrast to a target system or target computing system, which may denote an end-point of the live-migration.

The term application may denote a program running on the operating system of a computing system. The application may be a network control program, a database control program, other kind of middleware applications, or a service that delivers data to a user facing program having a graphical user interface. In this sense, it may, e.g., be a server component for a calendar application used by a computer user. The application may be implemented as computing or simply service, as Web-service or in any other form with interfaces to other applications, programs or services. However, on the other hand, a data exchange may also be done by storing data and reading data from a persistent storage. In other words, the application may be any program for a computing system as understood by a skilled person.

The term downtime may denote a time period when a program or application or an operating system may not deliver any service to another program accessing it. Basically, it may denote a time of unavailability.

The term tracking mode of a tracking program may denote a status of monitoring changes or modifications to a disk system and storing information, i.e., data modification information, about these changes in a persistent storage, e.g., a file that may be stored on a disk system, or in any other form.

The term recovery mode of a computing system, in particular the second computing system, may denote a status in which the operating system may not be fully functional. It may only be activated to receive information for a disk copying or, in this case, a one off disk mirroring, purposes from another computer; however, end user applications may not be run in such a recovery mode. In addition to the receiving the data modification information for further disk updating, e.g., a tracking file, the activation may comprise applying the content of the tracking file to the disk system of the second computing system being in recovery mode.

The term "tracks and stores" may denote the function that may be performed by the tracking program explained under "tracking mode".

The term disk system may denote a long-term storage system in a computing system. It may be a hard drive or equivalent persistent storage.

The term shutdown may denote the process of deactivating activities of a computing system. Shutting down of an operating system of a computing system may typically require a series of activities in order to guarantee a consistent status of related disk systems. Typically, applications and processes may be stopped one after the other. In the context of this application, it may be required to operate the tracking tool very long during the shutdown process, i.e., as long as possible or until just before the core of the operating system is shut down, such that no further modifications to the content of the disk system may made. In this application, the term "shutdown" my be differentiated from the term "complete shutdown".

The term "complete shutdown" may be equivalent to a power-off status of a computing system, i.e., remove power from a computer's main components in a controlled way. After a computer is shut down, main components such as CPUs, RAM modules and hard disk drives may be powered down or in a comparable status. Some internal components, such as an internal clock, or a power-down control unit, or a restart control unit may still be active, and may retain power. The complete shutdown may require the process of a shutdown beforehand, i.e., application and supporting processes may be taken offline one after the other, as described above.

The term restarting may denote a process of "awaking" a computing system again. It may mean switching on power to all relevant components and starting at least an operating system such that the computing system is operable and ready to receive commands.

The term client/server application may denote program components that have been implemented according to the client/server programming and operations model and that may act as a distributed application which partitions, tasks or workloads are split between providers of a resource or service, called servers, and service requesters, called clients.

The term cloud computing environment may denote a delivery and architecture model of computing as a service to a community of end-recipients. These may typically, but not necessary access the service by a web browser. However, also other services could consume results of and/or communicate with other services in the known sense of cloud computing.

The proposed method for live-migration of an operating system and an application may offer a couple of advantages:

As discussed above, live-migrations from one VM (virtual machine) to another VM is known in the art by freezing the complete VM in memory and then transferring the frozen machine to a new environment. However, this process is not possible for physical machines because the memory status of a hardware computer cannot be frozen without stopping any operation, e.g., a shutdown of the computer including the operating system. On the other side, the main memory of a computer may have temporary data, or data required for other services, supporting or collaborating with an application such that without these data for the other services the application may function differently, e.g., incorrect. Thus, no correct and complete migration may be feasible.

The proposed new method may overcome these limitations regarding live-migrations from one physical computer to another physical computer. It may not be enough just to transfer an application in a definite status but also environmental memory statuses, e.g., of the operating system and related services. However, the proposed method may also work for a live-migration from a physical to a virtual, a virtual to a physical, and a virtual and to a virtual machine. Hence, no differentiation may have to be made between different migration types.

Thus, the here proposed method may guarantee for a complete mirroring of all data during a shutdown state of a source computer and may allow having a consistent state and flush all the buffers from applications and the operating system. Whereas known solutions may claim to have a consistent state at application level, here it may also be assured that the coherence may be maintained at the operating system level. It may also enable a small downtime equivalent to a reboot: Whereas solutions for VMs may have to specify which applications may have to be stopped and the order of the applications to be shutdown, the proposed solution may use the default operating system shutdown process and thus, may not need to specify neither any critical application nor any ordering of applications to be shutdown. It may allow migrating data at disk block level or a file level and thus, reduce the write operations for data storage during tracking and maintain a small tracking file.

Advantageous embodiments and enhancements may now be described:

According to one embodiment of the method, the application may be a server component of a client/server application or a service in a cloud computing environment. Here, "service" may be interpreted in the sense of a process under the operating system. With this feature, user facing components of application programs may not detect any interrupts of operation. No new bitmaps or screen layouts may be needed to be generated. From a user perception, only a small delay, but no interrupt in the operation of the server application may be detectable.

According to an enhanced embodiment of the method, the first and second computing system may each be a physical computer. Having the first and the second computing system implemented as physical system, the advantages of the proposed method may be exploited fully.

According to another embodiment of the method, the first and second computing system is one out of a physical computing system and a virtual machine. Thus, also a mixed live-migration may be possible (see above).

According to one more enhanced embodiment of the method, during the restart of the first computing system, the tracking tool is in a first migration mode performing no tracking and storing of data modification information to the disk system of the first computing system. In particular, the tracking tool may perform a sending of data modification information stored prior to the complete shutdown to a second or target computing system. Thus, the original status that needs to be guaranteed may not be disturbed by data modification information generated during a reboot of the source computer.

According to an alternative embodiment, the method may allow, during the restart of the first computing system, that the tracking tool may track data modification information to the disk system of the first computer system, and if the data modification information may be related to data in the tracking file captured during the shutdown then overwriting the related data in the tracking file with the tracked data modification information before the sending of the tracking file. This may also mean that if data may be modified that do not relate to data in the tracking file the modifications may be ignored.

According to another enhanced embodiment of the method, the overwriting of the data in the tracking file may also comprise, before the overwriting, reading the related data in the tracking file captured during the restart and store them in a backup file. This way, this information may not be lost and may be used as additional information during a reboot of the second computing system. The information stored in the backup file may be used to re-establish a status of the disk system before the shutdown of the related computer.

According to yet another enhanced embodiment of the method, the starting of the second computing system may comprise the starting of the operating system and the tracking tool in a second migration mode, wherein the tracking tool on the second computing system may re-build a mirror of disk system of the first computing system for the second computing system based on the sent data modification information, in particular the received tracking file. The starting of the second computing system may also control a restarting or, rebooting of the operating system on the second computing system, and starting the application on the second computing system.

In one embodiment of the method, the tracking tool may be implemented as a service, in particular, in the sense of a process under control of the operating system. Thus, the proposed method may advantageously be implemented in cloud computing environments in which not only virtual machines and also physical machines may be used.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for live-migration of an operating system and an application is given. Afterwards, further embodiments of the source and target computing system for live-migration and the related method will be described.

FIG. 1 shows a block diagram of the inventive method for live-migration 100 in accordance with an illustrative embodiment. The method may migrate an operating system running on a first computing system, e.g., on a physical computer or a virtual machine, and an application running on the operating system to a second computing system. Form a user perspective, the application may not show an externally detectable downtime during live-migration of the application. The method may comprise performing a disk copying, 101, from a disk system of the first computing system or source computing system to a disk system of a second computing system or target computing system, as well as operating, 102, a tracking tool running on the first computing system in a tracking mode, wherein the tracking tool tracks and stores data modification information to a disk system of the first computing system after the disk copying, 101, in a tracking file. The tracking tool may be started before the copy process may happen because the tracking tool may control the operation of the disk copy process. The tracking file may, in particular, be stored on the disk system of the first computing system. Furthermore, the method may comprise triggering, 104, a shutdown of the first computing system, while the tracking tool may continue to operate in tracking mode during the shutdown as long as possible, e.g., without disturbing the shutdown—in particular, it may be stopped as last service before a shutdown of the operating system—and shut down the first computing system completely. The shutdown may be equivalent to a power-down status of the computing system. Other control units may still be operable, e.g., a shutdown control module and/or a restart control module.

The method may further comprise restarting, 106, the first computing system and sending, 107, the data modification information stored, in particular in the tracking file, prior to the complete shutdown of the first computing system to the second computing system. This may be performed using normal communication techniques and networks of modern computers.

In step 108 of the method, a modification of the content of the disk system of the second computing system based on the data modification stored in the tracking file may be performed. With this step, the content of the disk system of the second computing system may be identical to the content of the disk system of the first computing system at complete shutdown of the first computing system.

In particular, during reboot of the first computing system no track and store of modifications to the disk system may be in operation. Alternative embodiments may also comprise a tracking and storing of modifications to the disk system of the first computing system, which may also comprise a backup of elements of the tracking file as described above.

The method may further comprise starting, 109, the operating system on the second computing system based on the sent, respectively, received data modification information. Starting may be a synonym for power on and start the operating system and related services for a full functioning system.

The method may also comprise starting, 110, the application, which is the same as the application on the first computing system due to the mirrored disk system on the second computing system, and resume operation of the application. This resume may continue the operation at exactly the status it may have been stopped on the first computing system before the live-migration. A user or another program may not detect that a live-migration may have been performed. Only a small delay in response time may have been registered.

It may also be noted that the copying may not only start at a time problems may be detected at the first computing system such that a migration of the operating system and applications to another hardware system may be required. However, the copying may be performed any time during normal operation of the first computing system. Thus, a disk copying may not be performed during the shutdown of the first computing system—but it could and is an option. However, changes to the content of the disk system of the first computing system after a disk copying to the disk system of the target computing system may be tracked in the tracking file, e.g., in the first computing system. Thus, changes made to the disk system of the first computing system may be reconstructed using the copied disk and the information in the tracking file.

Figure 2:
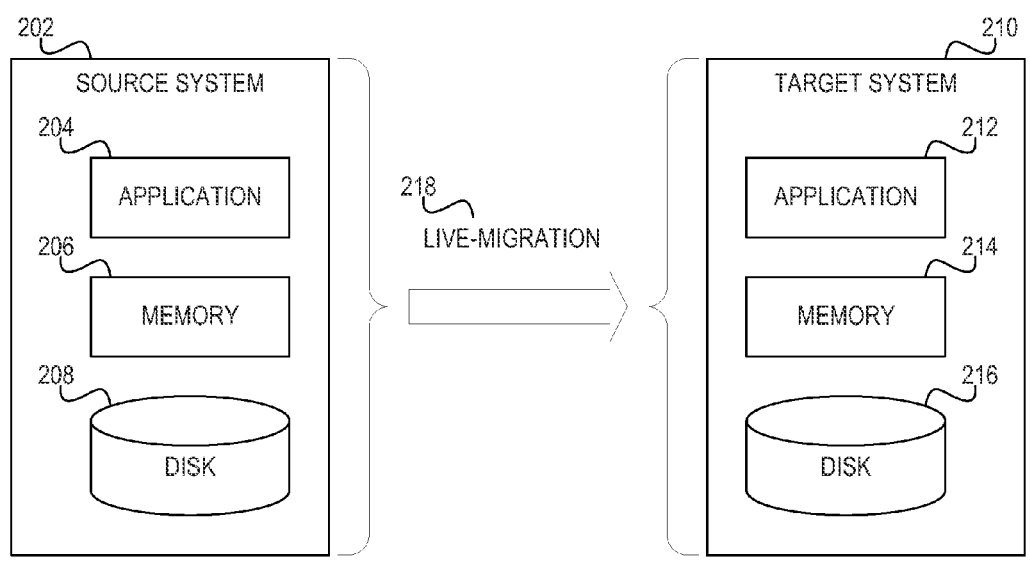
FIG. 2 shows a block diagram of an embodiment of a general live-migration concept.

FIG. 2 shows a block diagram of a general live-migration concept in accordance with an illustrative embodiment. A first computing system or computer 202 may be the source computer. It may have a CPU (not shown), a disk 208, a memory 206, and an application 204 running on an operating system (not shown). The target system 210 may have equivalent components: the application 212, the memory 214, and the disk or disk system 216. A live-migration of the operating system and the application 204 running on the source computing system 202 to the application 212 running on the target system 210 may be indicated by arrow 218. From a user perspective, services demanding data from application 204, 212 may detect no or nearly no interrupt of the operation of the application.

It may be noted that the concept may also be based on mirrored disks 208, 216. However, a known disk mirror process does not allow a completely mirrored disk because the time of the shutdown may not be correctly reflected in the mirroring. Temporary data such as e.g., buffer data that may essentially be required for supporting services to the application may not have been mirrored to the disk system of the second computing system by known techniques.

Figure 3:
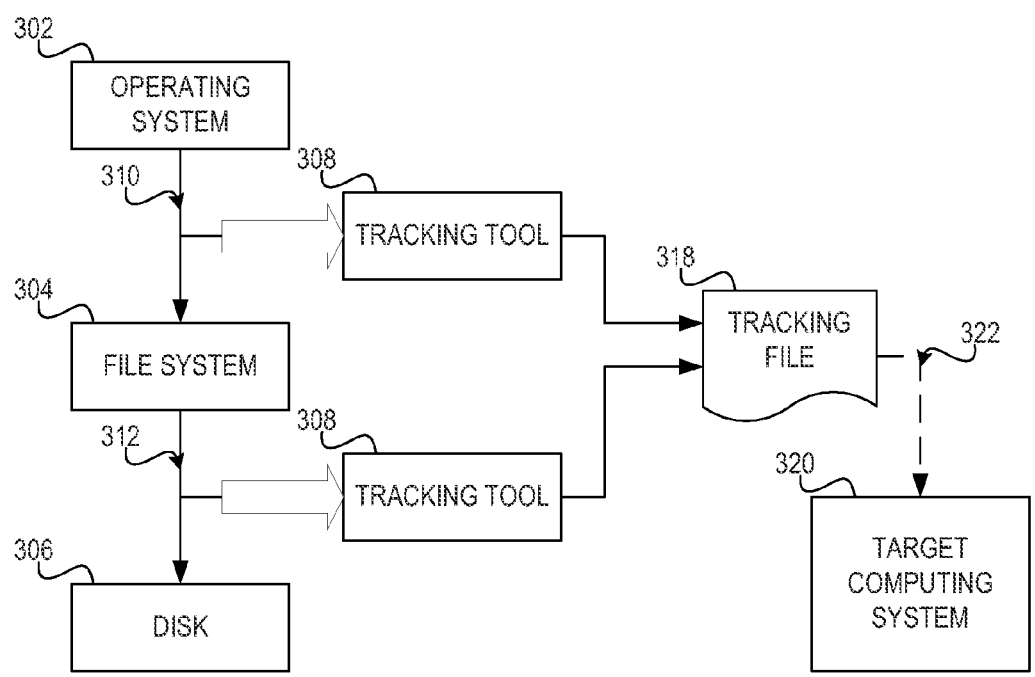
FIG. 3 shows a block diagram of logical positions of an embodiment of the tracking tool.

FIG. 3 shows a block diagram of logical positions of the tracking tool 308 in accordance with an illustrative embodiment. Data that may modify the disk 306 may either be tracked at connection 310 between the operating system 302 and a file system 304. In this case, the tracking may be performed on file level. If the tracking tool may track the modification at point 312, i.e., between the file system 304 and the disk 306, then the tracking may be performed on block level assuming that the data storage may be organized in blocks on the disk system. This may be the case in almost any state-of-the-art disk systems. The tracking tool 308 may either capture the data modification information, as indicated by arrow 314 or arrow 316. In both cases, the data modification information may be stored in a tracking file 318. When the tracking tool 308 may be in a first migration mode—in particular, after a reboot of the source computer—the tracking tool 308 may send the tracking file 318 to the second or target computing system 320, as indicated by arrow 322. Here it may be used to build a complete mirrored disk system on the second disk system compared to the disk system attached to the first computing system at complete shutdown time.

Figure 4:
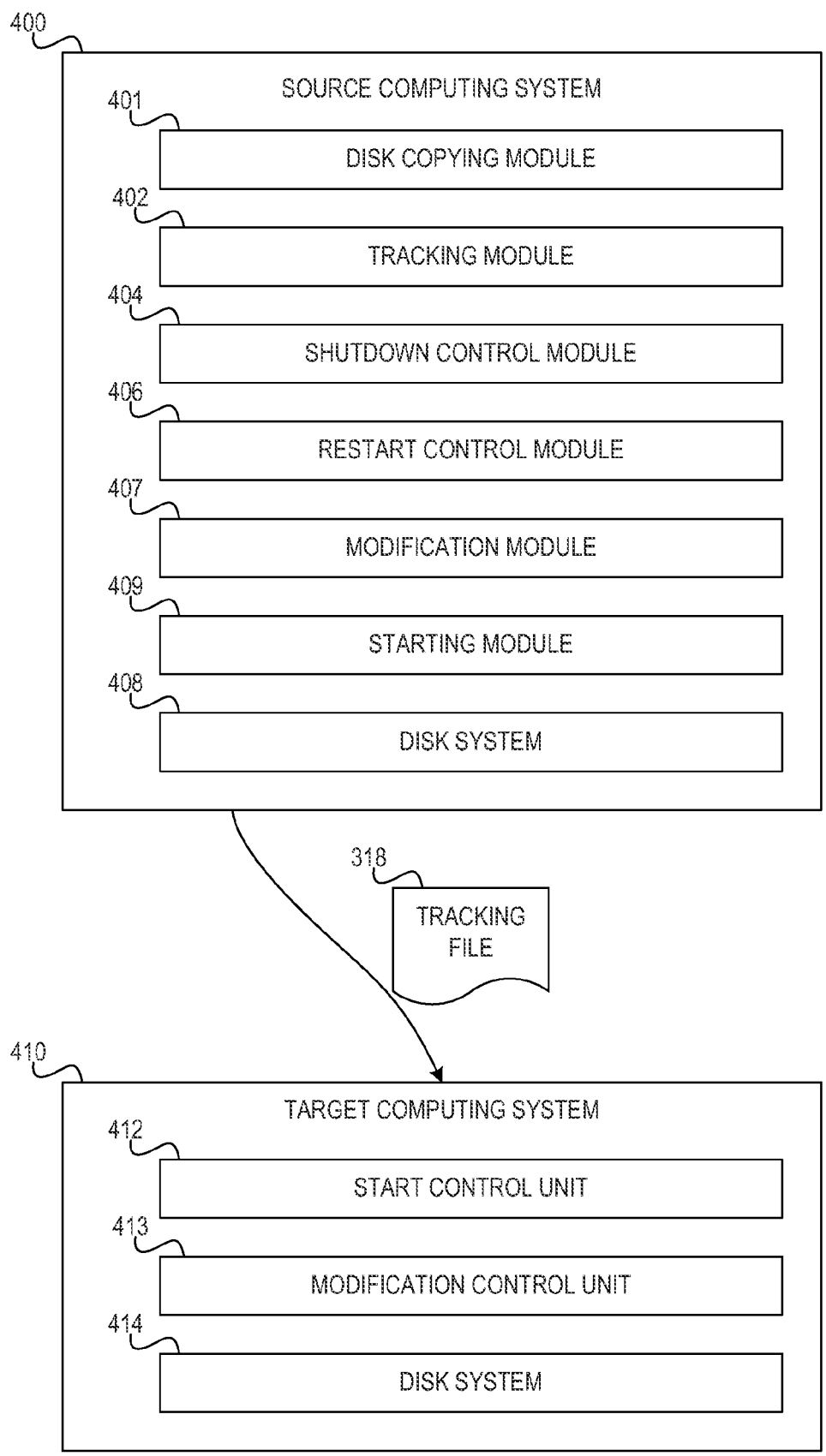
FIG. 4 shows embodiments of a source computing system and a target computing system performing the inventive method.

FIG. 4 shows a source or first computing system 400 and a target or second computing system 410 (equivalent to ref.-num. 320) executing the inventive method for live-migration of an operating system running on a first computing system 400 and an application running on the operating system in accordance with an illustrative embodiment. The source computing system 400 may comprise a disk copying module 401 and a tracking module 402 running on the source computing system 400 in a tracking mode, wherein the tracking module 402 tracks and stores data modification information to a disk system 408 of the source computing system 400 in a tracking file 318. The source computing system 400 may comprise a shutdown control module 404 adapted for triggering a shutdown of the source computing system 400. It may also be adapted for controlling that the tracking module 402 may continue to operate in tracking mode during the shutdown process as long as possible. This means that the tracking tool may be stopped as last service before the operating system itself shuts down and no more modification to the content of the disk system of the source computing system are performed.

The shutdown control module 404 may also be adapted for shutting down the source computing system 400 completely. Furthermore, the source computing system may comprise a restart control module 406 adapted for restarting the source computing system 400 and sending the data modification information stored prior to the complete shutdown of the source computing system 400 such that the data modification information may be usable by a target computing system 410 for starting the operating system on the target computing system 410 based on the data modification information For this purpose a modification module 407 may be available which may be adapted for triggering a modification of the content of the disk system 414 of the target computing system 410 using the sent data modification information, such that the disk system 414 of the target computing system 410 may represent a status of the disk system 408 of the source computing system 400 directly before or at the complete shutdown.

A starting module 409 may be adapted to trigger the starting of the target computing system in full functioning mode—in particular the operating system—and starting the application on the target computing system 410, and resume operation of the application.

FIG. 4 shows also a target computing system 410 for a live-migration to this target computing system 410. The live-migration may concern an operating system executable on a source computing system 400 and an application executable on the operating system of the source computing system 400. The target computing system may comprise a modification control unit 413. It may be adapted for receiving a trigger signal from the source computing system 400 to modify the content of the disk system 414 of the target computing system 410 using the received tracking file 318, such that the disk system 414 of the target computing system 410 may represent a status of the disk system 414 of the source computing system directly before, or at respectively, the complete shutdown of the first computing system 400.

Furthermore, a start control unit 412 may be available which may be adapted for starting the operating system on the target computing system 410. The transfer of the tracking file 318 may be indicated by arrow 416. The data modification information may have been captured after the disk copying, e.g., during a shutdown of the operating system of a source computing system 400 in a tracking file 318. The start control unit 412 may also be adapted for starting the application on the target computing system 410. The received data modification information in the tracking file 318 may be used to generate a completely mirrored disk system 414 as part of the target computing system 410 if compared to the disk system 408 of the source computing system 400. Also data modifications during the shutdown of the source computing system's disk system 408 may be reflected.

In a nutshell, the new element of the provided method may differentiate from the known technique of migration, as shown in table 1:

TABLE 1

| known solution | proposed method |
| --- | --- |
| 1. stop of the defined critical applications on the source machine | 1. set the tracking tool to shutdown mode or first migration and track disk changes |
| 2. stop the disk mirror tool on the source machine and shut it down | 2. trigger a reboot of the source machine |
| 3. start the target machine and configure it | 3. the operating system restarts and the tracking tool sends the data modification information in the tracking file that was written during shutdown to the target machine |
| 4. start the critical applications on the target machine | 4. modify the disk system of the target machine |
| | 5. start the target machine and configure it |
| | 6. start the migrated applications on the target machine |

It may be noted that the term machine may be denote a computer or computing system, in particular, a physical computer.

It may also be noted that the restart or reboot of the source computing system may be performed according to the following steps:

Step 1: The operating system may start and load the tracking tool.

Step 2: The tracking tool may restore its state and may determine that it is the reboot state.

Step 3: The tracking tool may follow all the data modifications on the disk, but may not write them into the tracking file, instead, the behavior may be the following:
If a data modification may not overwrite data modification information in the tracking file, then the modification may be skipped.

Step 4: A new data modification may overwrite a change made during the prior performed shutdown.

Step 5: The tracking tool may have to read the data that may have to be overwritten before over-writing and may store it in a backup file.

Step 6: The tracking tool may then overwrite the data with the new data in the tracking file.

Step 7: The tracking tool may then remove the entry from the tracking file.

When the live-migration starts, then the following steps may be performed:

Step A: The migration tool may send the content of the tracking file to the target computing system.

Step B: The migration tool may send the content of the backup file to the target computing system.

Step C: The migration tool may now mark the migration as successful from a source computing system perspective.

It may also be noted that a tracking tool may be used that may write directly into the backup file during the shutdown. But such an algorithm would be less effective as it means that data may be written twice and could cause performance disruption.

Additionally, worthwhile mentioning may be that the source computing system and the target computing system may be treated as a super-system or migration system comprising both, the source and the target computing system.

Figure 5:
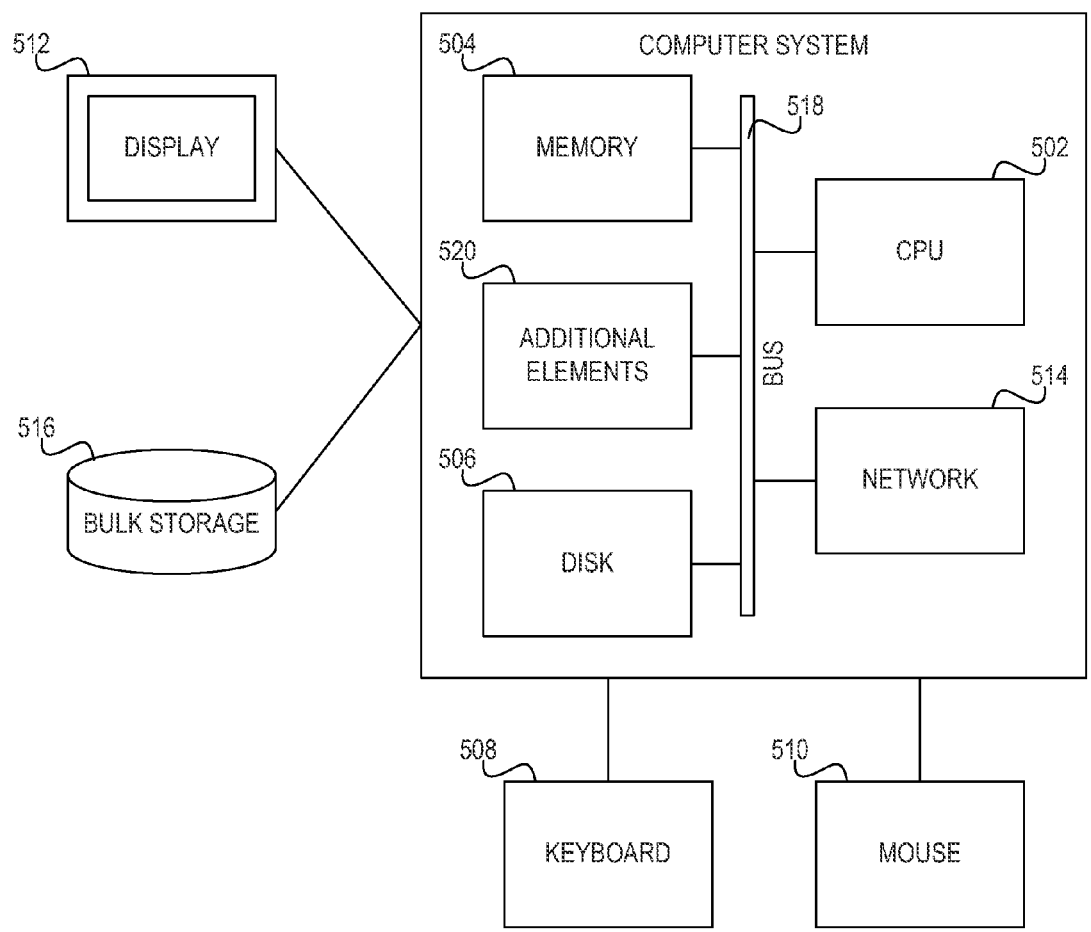
FIG. 5 shows an embodiment of a computing system as an example of a source or target computing system in more details.

Embodiments of the invention may be implemented together with virtually any type of computer, regardless of the platform being suitable for storing and/or executing program code. For example, as shown in FIG. 5, a computing system 500—which may be an embodiment of a source or a target reference computing system—may include one or more processor(s) 502 with one or more cores per processor, associated memory elements 504, an internal storage device 506 (e.g., a hard disk, an optical drive such as a compact disk drive or digital video disk (DVD) drive, a flash memory stick, a solid-state disk, etc.), and numerous other elements and functionalities, typical of today's computers (not shown). The disk 506 may correspond to the disk system 408 (FIG. 4), in case of the source computing system; and it may correspond to the disk system 414 (FIG. 4), in case of the target computing system. Alternatively, the disk 506 may be a disk in addition to disks 408, 414 (FIG. 4). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, reference numeral 520 may represent additional elements of the source computing system as indicated in FIG. 4, e.g., the tracking module 402, the shutdown control module 404, and the restart control module 406, the modification module, and the staring module. Alternatively, reference numeral 520 may represent additional elements of the target computing system as indicated in FIG. 4, e.g., the start control unit 412 and the modification control unit.

The computing system 500 may also include input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for a live-migration of an operating system running on a first computing system and an application running on the operating system to a second computing system, so that the application shows no externally detectable downtime during the live-migration of the application, the method comprising:
   performing a disk copying from a disk system of the first computing system to a disk system of the second computing system, wherein the second computing system is operating in a maintenance mode,
   operating a tracking tool running on the first computing system in a tracking mode, wherein the tracking tool tracks and stores data modification information to the disk system of the first computing system after the disk copying in a tracking file,
   triggering a shutdown of the first computing system while the tracking tool continues to operate in the tracking mode during the shutdown as long as possible and shutting down the first computing system completely,
   restarting the first computing system,
   sending the tracking file comprising the data modification information stored prior to the complete shutdown of the first computing system to the second computing system,
   modifying content of the disk system of the second computing system using the sent data modification information, such that the disk system of the second computing system represents a status of the disk system of the first computing system directly before the complete shutdown, and
   starting the operating system on the second computing system in a full functioning mode, wherein starting the operating system on the second computing system in the full functioning mode comprises:
      initially starting the operating system and the tracking tool in a second migration mode, wherein the tracking tool on the second computing system re-builds the mirrored disk system based on the sent data modification information;
      restarting of the operating system on the second computing system, and
      starting the application on the second computing system and resuming operation of the application such that from a user perspective no disruption of a continuous operation of the application is detectable.

2. The method according to claim 1, wherein the application is a server component of a client/server application or a service in a cloud computing environment.

3. The method according to claim 1, wherein the first computing system and the second computing system are each a physical computer.

4. The method according to claim 1, wherein the first computing system and the second computing system are each one of a physical computing system or a virtual machine.

5. The method according to claim 1, wherein, during the restart of the first computing system, the tracking tool is in a first migration mode performing no tracking and storing of the data modification information to the disk system of the first computing system.

6. The method according to claim 1, wherein, during the restart of the first computing system, the tracking tool tracks the data modification information to the disk system of the first computer system, and, if the data modification information is related to data in the tracking file captured during the shutdown, then overwriting the related data in the tracking file with the data modification information captured during the restart before the sending of the tracking file.

7. The method according to claim 6, wherein the overwriting also comprises, before the overwriting, reading the related data in the tracking file captured during the restart and store the related data in a backup file.

8. The method according to claim 1, wherein the tracking tool is implemented as a service.

9. A data processing system comprising:
   a processor; and
   a memory coupled to the processor, wherein the memory comprises instructions which, when executed by the processor, cause the processor to:
   perform a disk copying from a disk system of a first computing system to a disk system of a second computing system, wherein the second computing system is operating in a maintenance mode,
   operate a tracking tool running on the first computing system in a tracking mode, wherein the tracking tool tracks and stores data modification information to the disk system of the first computing system after the disk copying in a tracking file,
   trigger a shutdown of the first computing system while the tracking tool continues to operate in the tracking mode during the shutdown as long as possible and shutting down the first computing system completely,
   restart the first computing system,
   send the tracking file comprising the data modification information stored prior to the complete shutdown of the first computing system to the second computing system,
   modify content of the disk system of the second computing system using the sent data modification information, such that the disk system of the second computing system represents a status of the disk system of the first computing system directly before the complete shutdown, and
   start the operating system on the second computing system in a full functioning mode, wherein the instructions to start the operating system on the second computing system further causes the processor to:
      initially start of the operating system and the tracking tool in a second migration mode, wherein the tracking tool on the second computing system re-builds the mirrored disk system based on the sent data modification information,
      restart of the operating, system on the second computing system, and
      start the application on the second computing system and resuming operation of the application such that from a user perspective no disruption of a continuous operation of the application is detectable.

10. The data processing system of claim 9, wherein the application is a server component of a client/server application or a service in a cloud computing environment.

11. The data processing system of claim 9, wherein, during the restart of the first computing system, the instructions to operate the tracking tool further cause the processor to operate the tracking tool in a first migration mode performing no tracking and storing of the data modification information to the disk system of the first computing system.

12. The data processing system of claim 9, wherein, during the restart of the first computing system, the instructions to operate the tracking tool further cause the processor to operate the tracking tool to track the data modification information to the disk system of the first computer system, and, if the data modification information is related to data in the tracking file captured during the shutdown, then overwrite the related data in the tracking file with the data modification information captured during the restart before the sending of the tracking file.

13. The data processing system of claim 12, wherein the instructions to operate the tracking tool further cause the processor to operate the tracking tool such that the overwriting also comprises, before the overwriting, reading the related data in the tracking file captured during the restart and store the related data in a backup file.

14. A computer program product comprising a non-transitory computer readable storage medium having a computer readable program stored therein, wherein the computer readable program, when executed on a computing device, causes the computing device to:

perform a disk copying from a disk system of a first computing system to a disk system of a second computing system, wherein the second computing system is operating in a maintenance mode, operate a tracking tool running on the first computing system in a tracking mode, wherein the tracking tool tracks and stores data modification information to the disk system of the first computing system after the disk copying in a tracking file, trigger a shutdown of the first computing system while the tracking tool continues to operate in the tracking mode during the shutdown as long as possible and shutting down the first computing system completely, restart the first computing system, send the tracking file comprising the data modification information stored prior to the complete shutdown of the first computing system to the second computing system, modify content of the disk system of the second computing system using the sent data modification information, such that the disk system of the second computing system represents a status of the disk system of the first computing system directly before the complete shutdown, and start the operating system on the second computing system in a full functioning mode, wherein the computer readable program to start the operating system on the second computing system further causes the computing device to:

initially start of the operating system and the tracking tool in a second migration mode, wherein the tracking tool on the second computing system re-builds the mirrored disk system based on the sent data modification information restart of the operating system on the second computing system, and start the application on the second computing system and resuming operation of the application such that from a user perspective no disruption of a continuous operation of the application is detectable.

15. The computer program product of claim 14, wherein the application is a server component of a client/server application or a service in a cloud computing environment.

16. The computer program product of claim 14, wherein, during the restart of the first computing system, the computer readable program to operate the tracking tool further causes the computing device to operate the tracking tool in a first migration mode performing no tracking and storing of the data modification information to the disk system of the first computing system.

17. The computer program product of claim 14, wherein, during the restart of the first computing system, the computer readable program to operate the tracking tool further causes the computing device to operate the tracking tool to track the data modification information to the disk system of the first computer system, and, if the data modification information is related to data in the tracking file captured during the shutdown, then overwrite the related data in the tracking file with the data modification information captured during the restart before the sending of the tracking file.

18. The computer program product of claim 17, wherein the computer readable program to operate the tracking tool further causes the computing to operate the tracking tool such that the overwriting also comprises, before the overwriting, reading the related data in the tracking file captured during the restart and store the related data in a backup file.

* * * * *